FIG. 4 RADIUS VS % OF RADIATION ABSORBED

RADIUS of HEATING SECTION VS. WALL TEMPERATURE for the CASE WHERE 30% of the RADIATION is ABSORBED RADII & LENGTHS REQUIRED for a CORE GAS to ABSORB 30% of the RADIATED POWER from WALLS of SUFFICIENT AREA to EMIT 1000 MEGAWATTS

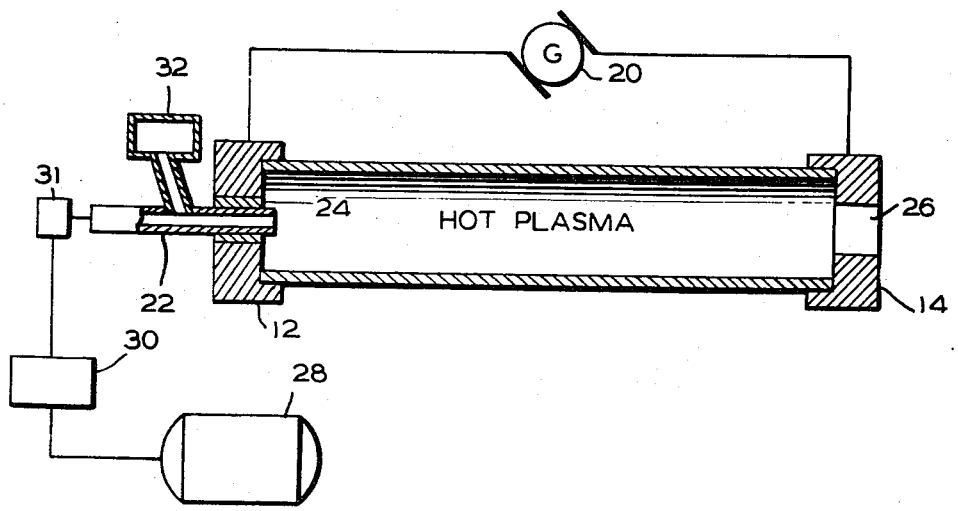
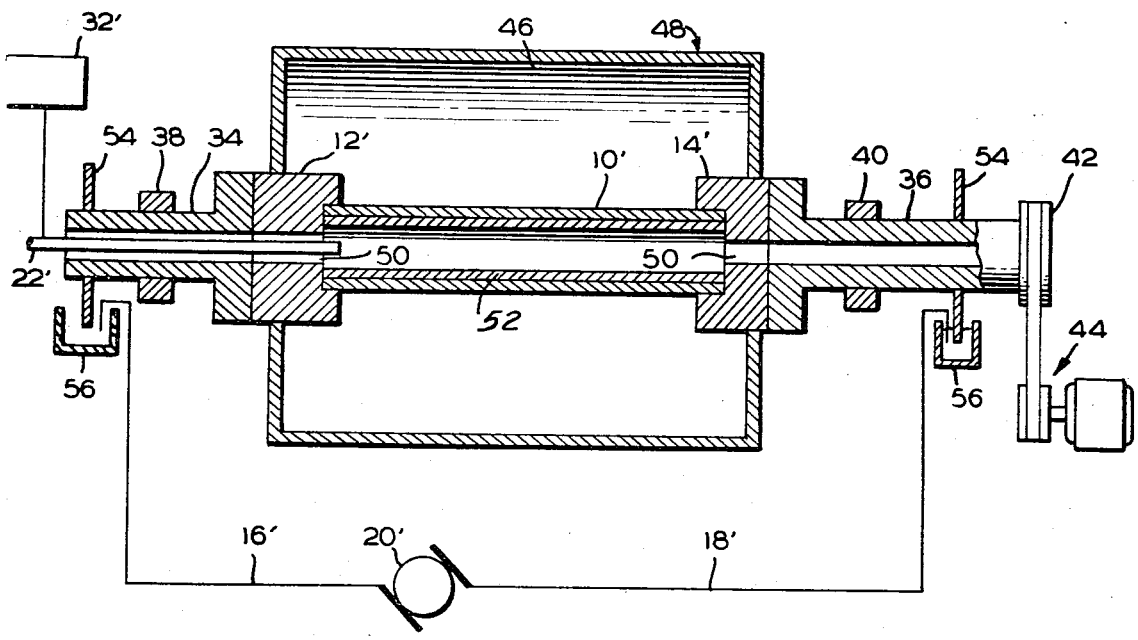

United States Patent Office 3,715,110
Patented Feb. 6, 1973

3,715,110
RADIANT HEATING OF GAS STREAMS
Carl A. Jensen, Davis, and Lowell L. Wood, Jr., Simi, Calif. (both of Department of Geophysics and Planetary Physics, % University of California, Los Angeles, Calif. 90024)
Continuation-in-part of application Ser. No. 706,590, Feb. 19, 1968. This application Jan. 27, 1969, Ser. No. 794,265
Int. Cl. F27f 17/00
U.S. Cl. 432—29     8 Claims

ABSTRACT OF THE DISCLOSURE

This disclosure is concerned with a novel process for rapidly heating a gas stream to a specific range of very high temperatures by introducing said gas stream together with electrons or a source thereof into a heating zone which is subjected to thermal radiation and which contains a substantial quantity of a hot plasma which is preferably maintained under pressure.

The gas stream entering the heating zone mixes with the hot plasma and absorbs heat therefrom as well as from the walls of the heating zone itself by radiation. The heated plasma is then withdrawn from the heating zone at a rate such that the amount of plasma in the heating zone remains substantially constant.

---

The present invention is concerned with the problem of rapidly heating a gas stream to elevated temperatures, i.e., from 2000° to 7000° K., more preferably from 3000° to 7000° K. in a convenient and practical manner. As is well known in the art, it is extremely difficult to efficiently heat a gas by absorption of radiant energy since, at ordinary temperatures, gases are so transparent that they absorb little energy from a source of thermal radiation.

This application is a continuation-in-part of Ser. No. 706,590, filed Feb. 19, 1968, now abandoned.

The desirability of creating and utilizing a stream of high temperature gas is well recognized in several fields, including propulsion of rockets, generation of electric current by magneto-hydrodyanmics and melting and causing materials to react.

Heat transfer to a gas stream from any hot surface involves, of course, conduction and radiation, the latter being of little significance under ordinary conditions due to the transparency of gases to radiant energy. The desirability of increasing the opacity of radiation-transparent gases in order that they may be heated by radiant energy is recognized. Specifically, it has been suggested that the opacity of hydrogen gas can be increased by seeding it with small particles of solid material capable of absorbing radiation, such as carbon or refractory metals. The dispersed solid particles become rapidly heated when the gas is subjected to high thermal radiation, and the heat is transferred from the solid particles to the gas molecules largely by conduction. It is also known that the opacity of hydrogen itself increases with temperature up to about 10,000° K. and, hence, it is recognized that once an intermediate temperature, say 7000° K., is reached, radiant heating can proceed without the need for an opacifier.

Unfortunately, the seeding of a gas stream with solids has proven to be a relatively inefficient means of obtaining the rapid heating of gases to plasmic temperatures.

The instant invention solves the overall problem through the use of a novel process having three critical steps which coact with each other to accomplish the desired result.

As has heretofore been stated, it is extremely difficult to heat a gas to temperatures from about 2000° K. to about 7000° K. by subjecting it to thermal radiation for the reason that it does not sorb sufficient energy, due to its transparency.

Therefore, one characteristic of the instant invention is to introduce electrons or a source thereof into a gas stream for the express purpose of increasing its opacity. Although it is well known in the art to "seed" a gas with electrons in order to increase its electrical conductivity, it is indeed surprising to discover that seeding a gas with electrons increases its opacity.

Thus, the present invention provides a method for increasing the opacity of a gas stream at temperatures below the intermediate temperature and down to about 2000° K. and, more preferably, 2500° K. by means of a technique which involves seeding the gas with small amounts of electrons or a source thereof simultaneously with or prior to exposing the gas stream to thermal radiation. The seeding step may be accomplished by passing a portion of the gas through an electric discharge, by injecting electrons and pre-ionized atoms from an ion generator into the gas stream or by injecting into the gas stream an initially un-ionized material which has a low ionization potential and is consequently a good electron donor to the gas. The production of electrons for use in the seeding step may be carried out by conventional techniques. For example, very good results may be obtained by ionizing alkali metals or their compounds. Cesium is particularly suitable since it ionizes readily merely by heating the gas in which it is dispersed. In one known type of ion generator metallic cesium is ionized to cesium ions and free electrons by heating the metal to its boiling point and passing the resulting vapor through a heated porous tungsten plate which picks up electrons from the ionizing cesium.

While not wishing to be bound by any theory of operation, nevertheless, it appears that the effect of the electrons on the opacity of the gas does not depend on the radiation absorptive characteristics of the major constituents of the original gas alone, but rather, on the interaction of these constituents and the injected electrons with the radiation field. More specifically, the free electrons either become attached to the original atoms or molecules and may then be detached by absorbing radiant energy (a so-called bound-free transition) or the free electrons interact simultaneously with neighboring atoms or molecules and the radiation field to absorb radiant energy (a so-called free-free transition). The thus accelerated electrons then interact with gas atoms or ions to raise the temperature of the latter and in doing so the electron slows down. The slowed-down electron then interacts again with the atoms or molecules so as to be susceptible of being acted on by another photon from the radiation field. The sequence takes place very rapidly with a very large number of electron-atom or electron-molecule combinations with the overall result that the gas absorbs great quantities of radiation and is rapidly heated. The process is particularly applicable to the heating of heating of hydrogen, nitrogen and helium but is applicable to the heating of gases generally.

Thus, by way of an extremely simplified explanation, the introduction of electrons makes a gas opaque so that when it is subjected to thermal radiation, it has the ability to absorb energy, thereby raising its temperature.

The amount of seeding material which is employed in the novel process of this invention is not narrowly critical and can vary from 0.001 volume percent and lower to 25 volume percent and higher based on the total weight of gas introduced into the heating zone. The preferred range is from 0.1 to 10 volume percent.

The second critical feature of the novel process of this invention resides in maintaining a substantial quantity of hot plasma preferably under pressure in a heating zone. It has been discovered that the seeding of a gas stream is not sufficient in and of itself to rapidly heat a gas to an elevated temperature in a practical manner. By way of considerable over-simplification, it can be stated that if a gas stream were to be electron seeded and introduced into a heating zone and subjected to thermal radiation, a heating zone having an extremely impractical length would usually be necessary in order to raise the temperature of the gas to within the range of 2000 to 7000° K.

In order to overcome the problem of excessive length, it has been discovered that if the gas stream is introduced into a heating zone which already contains a substantial quantity of hot plasma, the incoming cold gas stream will absorb heat from the hot plasma as well as from the source of thermal radiation and reach its desired temperature in a comparatively short time.

The quantity of hot plasma maintained in the heating zone is not narrowly critical so long as a sufficient volume exists to transfer heat into the incoming gas stream and to simultaneously remain sufficiently opaque itself. Quite obviously, in actual operation, the major portion of the heating zone will be filled with hot plasma since the presence of this substantial quantity of hot plasma produces the major part of the absorption of the thermal energy.

The particular pressure at which the heating zone should be maintained is not narrowly critical and, in fact, atmospheric, sub-atmospheric and super-atmospheric pressures can be used. It is to be noted, however, that it can generally be stated that the lower the pressure which is maintained in the heating zone, the less quantity of hot gas will be obtained from said heating zone, although the time the material requires to be heated to a given temperature is substantially reduced. Thus, pressures of 0.1 atmosphere and lower can be employed for those applications wherein the quantity of hot gas emerging from the heating zone is not critical or where relatively rapid heating rates are desired. However, since the vast majority of applications require substantial quantities of hot gases, the heating zone should be maintained at a pressure of at least about 10 atmospheres up to any practical maximum which is determined by the material strengths of equipment employed. Particularly preferred ranges of pressure are from about 10 to about 150 atmospheres.

The third characteristic of the novel process of this invention resides in the withdrawal of hot plasma from the heating zone at a rate such that the mass of the plasma in the heating zone remains substantially constant. The reason why such a procedure is critical resides in the fact that if the plasma is withdrawn at too high a rate, the temperature in the heating zone will drastically decline due to the fact that there is not enough sufficiently opaque material present to absorb the thermal radiation. Additionally, too rapid a withdrawal of hot plasma does not allow a sufficient mass of hot material to mix with the incoming cold gas and transfer heat thereto. Therefore, the process of this invention requires the removal of hot plasma from the heating zone at a rate which is not substantially higher than the rate at which the cold gas is converted to at least moderately hot plasma, i.e., the mass of plasma in the heating zone remains substantially constant.

As has heretofore been stated, this invention is concerned with the heating of a gas stream to a temperature within the range of 2000 through 7000° K. by the novel process which includes the introduction of the gas stream, together with electrons or a source thereof, into a heating zone containing a substantial quantity of hot plasma, preferably maintained under pressure, and the withdrawal of the plasma from the heating zone at a rate such that the quantity of hot plasma within the heating zone remains substantially constant The heating zone which is employed in the novel process of this invention can be contained in any suitable apparatus. A stationary type chamber could be constructed of a refractory material, for example, tantalum carbide which has a melting point of about 4200° K. However, the preferred type heater for the process of this invention resides in the use of a hollow cylinder containing as its inner surface a layer of material heated to at least its melting point and held by predominantly centrifugal forces provided by the rotation of the cylinder about its central axis. Heaters of this type are generally referred to as rotating furnaces and have been described in the literature by Dr. Aristid V. Grosse et al., e.g., Chemical and Engineering News, volume 40, Oct. 29, 1962, pages 40 and 41.

The invention will be further understood with reference to the following drawings for hydrogen in which:

FIG. 9 is a schematic view of one form of heating apparatus suitable for carrying out the process of the present invention; and FIG. 10 is a schematic view of another form of heating apparatus suitable for carrying out the process of the present invention.

Figure 1:
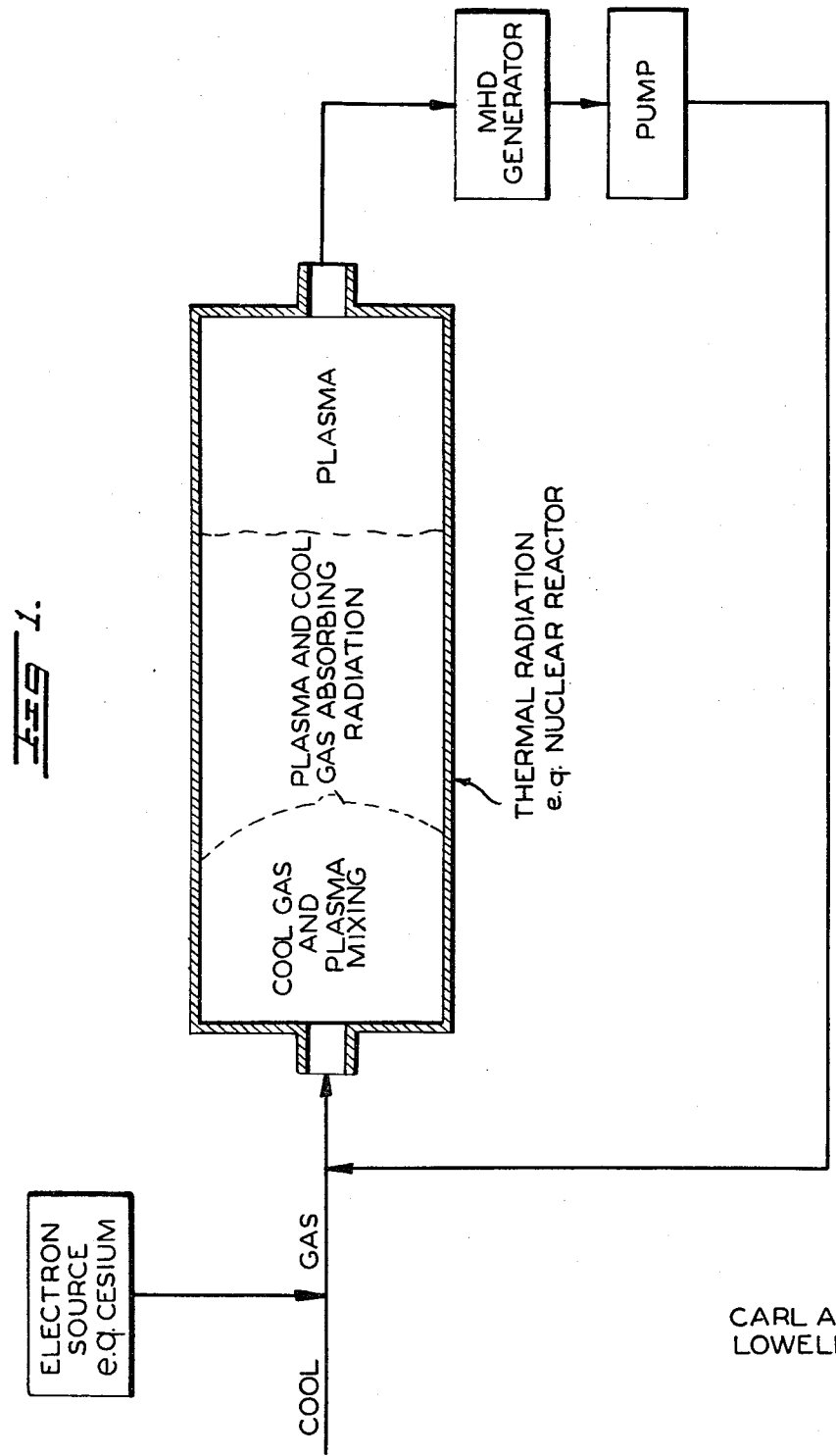
FIG. 1 represents a diagrammatic representation of the process of this invention.

FIG. 1 represents a typical flow sheet of a method of carrying out the instant invention. As can be seen from said figure, cool gas such as hydrogen, together with an alkali metal such as cesium is introduced into a heating zone which is subjected to thermal radiation, e.g., from a rotating furnace type nuclear reactor. The heating zone contains hot plasma which is preferably under pressure. The heating zone can be contained in a rotating furnace of the type known in the art and the cool gas enters into said heating zone and commences to mix with the hot plasma contained therein, absorbing heat therefrom. The now somewhat cooled plasma and the now somewhat warmed gas absorb thermal radiation from the walls of the heating zone until the gas is heated to the desired temperature and becomes plasma. The plasma is thereafter withdrawn from the heating zone and utilized in any desired manner. In the illustration of FIG. 1, the plasma is fed through an MHD generator and thereafter recycled to the heating zone by means of a pump of any type, e.g., a conventional high temperature turbo compressor, or an electro magnetic pump.

It is also possible to separate the cesium metal prior to using the hot gas if such is desired for various chemical uses wherein the presence of cesium metal might interfere with the desired reactions. If cesium separation is desired, the plasma from the heating zone is passed through a conventional separator wherein the cesium metal is removed and recycled back to the heating zone.

In the start-up of an operation, according to this invention a special technique is required since there would be no hot plasma in the heating zone. This problem is easily overcome by any number of ways including merely drastically reducing the gas input rate, i.e., the cool gas, together with a source of electrons, is allowed to remain in the heating zone until it becomes hot plasma at which point the pump is turned on, plasma withdrawn and cool gas introduced into the heating zone. The start-up operation does require a relatively long period of time (compared to the steady-state gas throughput rate) for the cool gas to become plasma since, as has been stated, no core of hot plasma is present initially.

Figure 2:
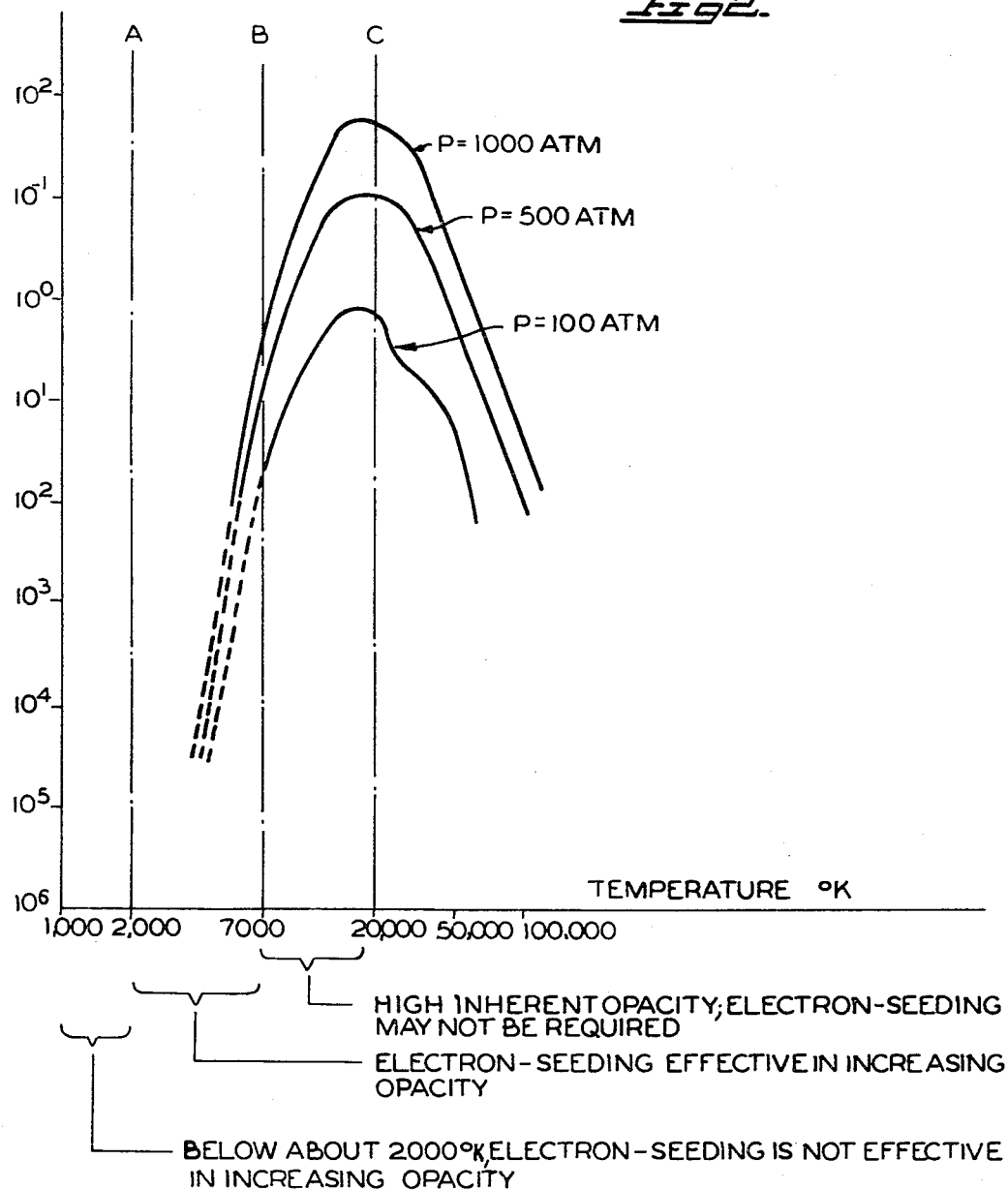
FIG. 2 is a graph of temperature versus the natural radiation transparency of hydrogen due to its own ionization and the presence of consequent electrons.

The graph of FIG. 2 illustrates in visual form the problem area attacked by the present invention. The graph relates specifically to hydrogen but the principles illustrated therein are applicable to other gases as well. It has been mentioned previously that the ability of a gas to absorb thermal radiation increases with an increase in temperature up to about 20,000° K. In the graph, this is illustrated by the lines extending in the temperature range A–B–C. The solid lines represent previously published, calculated values for the transparency of hydrogen above about 5000° K., the transparency being shown in Rosseland Opacity Units. The actual transparency or opacity units are of no particular significance to the present discussion, and it is important only to note that the ability of the gas to absorb thermal radiation falls off rapidly with a decrease in temperature. The dotted lines represent the approximate transparency of the gas below about 5,000° K. As mentioned previously, it has been recognized that at some temperature below about 20,000° K. the opacity of hydrogen gas will be sufficiently large that radiant heating of the gas to higher temperatures can be carried out efficiently. This intermediate threshold temperature is not, of course, an exact temperature, because the distinction between an inefficient radiant heating process and an efficient one depends on the particular circumstances. A practical threshold temperature is, however, about 7,000° K., and the graph therefore labels the temperature range B–C as the range in which high inherent opacity permits radiant heating without applying the principles of the present invention.

Below the threshold temperature the opacity of hydrogen gas toward thermal radiation is so low that radiant heating of a fast moving stream of the gas is impractical, and it is here that the utility of the present invention lies. As discussed previously, the presence of free electrons in the gas gives rise to a sequence of interactions which cause radiant energy to be rapidly absorbed, thereby rapidly increasing the temperature of the gas. Since free electrons will not exist in any appreciable concentration or for an appreciable time in almost all high pressure gases below some very high minimum temperature (cesium gas being a rare exception), the effective temperature range for the electron-seeding operation is between this minimum temperature and the aforementioned threshold temperature. The graph of FIG. 2 labels this effective range as A–B, wherein the minimum temperature has been chosen at a practical, working value of about 2,000° K.

Figure 3:
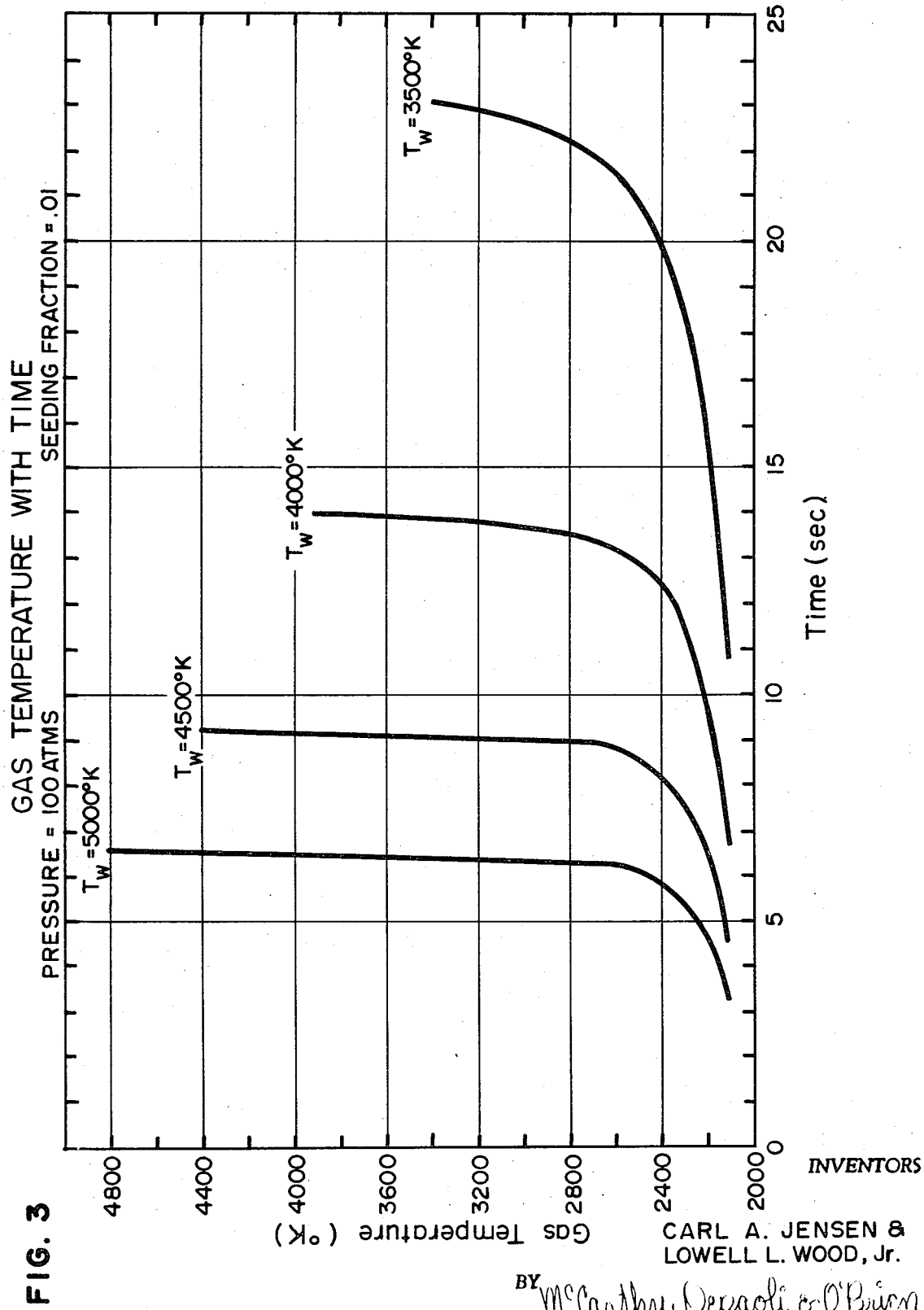
FIG. 3 is a graph of gas temperature versus time.

However, as has heretofore been set forth, although seeding is absolutely critical in the novel process of this invention, it does not accomplish the desired results in and of itself. Thus, FIG. 3 is a graph of gas temperature against time in a similar process but *without* maintaining a core of hot plasma in the heating zone. As can be seen, the time required to reach the desired temperatures is so long that extremely large reactors would be necessary.

Figure 4:
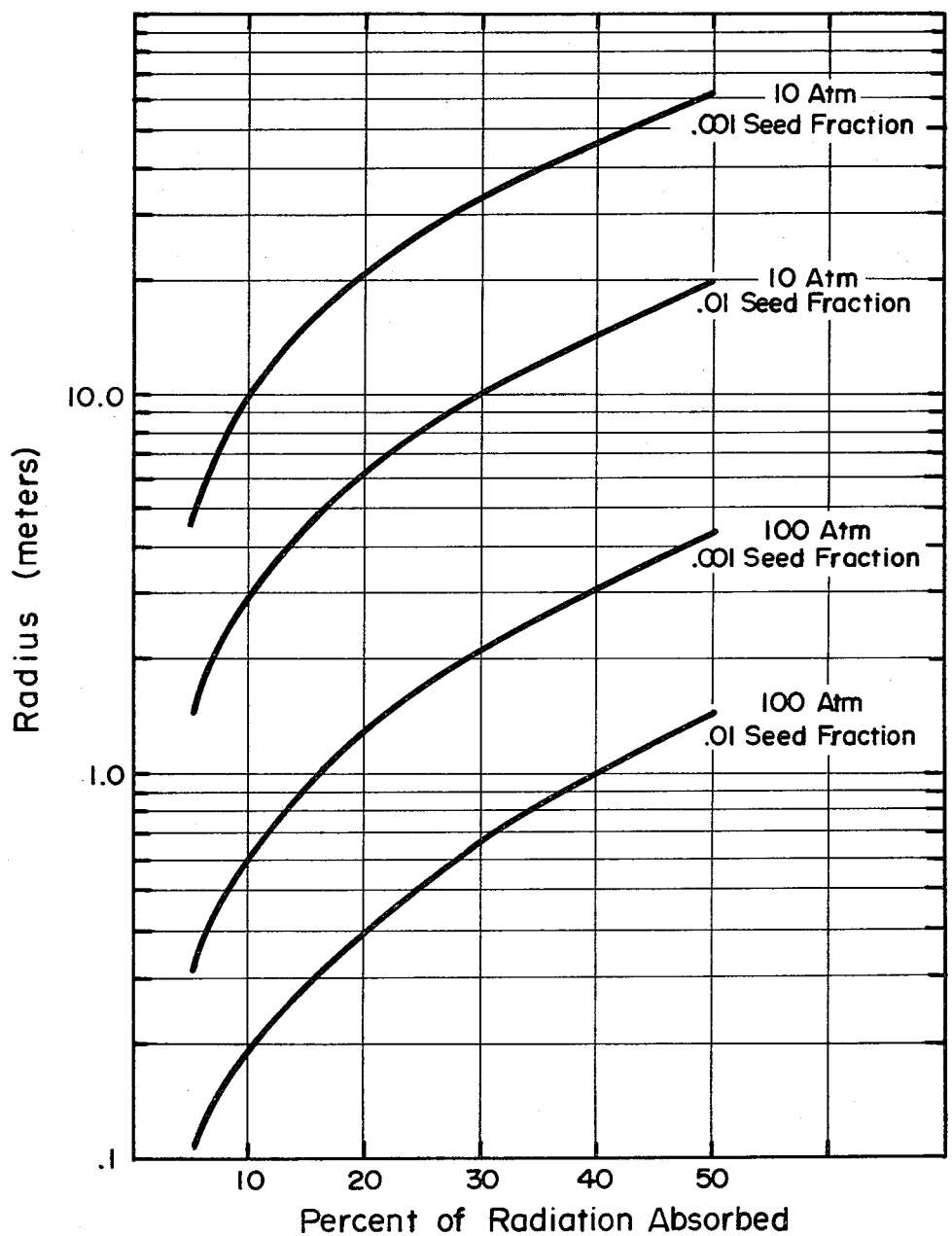
FIG. 4 is a graph of radius versus percent of radiation absorbed.
Figure 5:
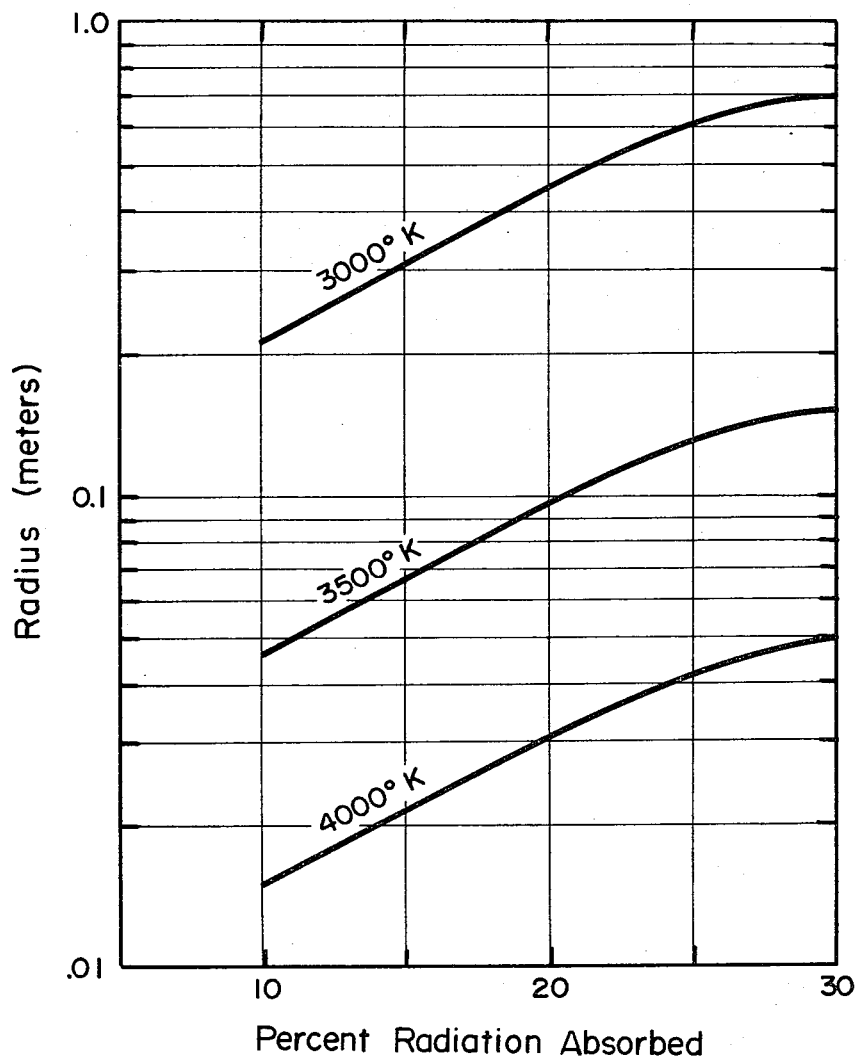
FIG. 5 is a graph of radius versus percent of radiation absorbed.

FIGS. 4 and 5 show the percentage of radiation absorbed as a function of cylinder radius for a specified set of operating conditions. Data were calculated for wall temperatures of 3,000° K., 3,500° K. and 4,000° K. and at pressures of 10 and 100 atmospheres and seed fractions of 0.01 and 0.001.

This heat absorbed by the hot core gas is then available for transfer to incoming cool gas. These figures give an indication of the dependence of the radius of a cylindrical gas heater to the wall temperature, gas pressure and seed fraction to absorb a specific portion of the radiation emitted by the wall as this radiation passes through the gas. Thus, at 100 atmospheres of hydrogen pressure, at 0.01 seed fraction and a gas temperature of 2,700° K., 30% of the power of the radiation emitted by the walls of a cylindrical gas heater having a radius of 0.7 meter is absorbed by the gas contained therein. Of course, the remaining 70% of the power of the emitted radiation is re-absorbed by the opposite wall.

FIG. 5 further shows the dependence of the percent of radiation absorbed with the radius of a cylindrical gas heater when the wall temperature (and corresponding core gas temperature) is varied.

Figure 6:
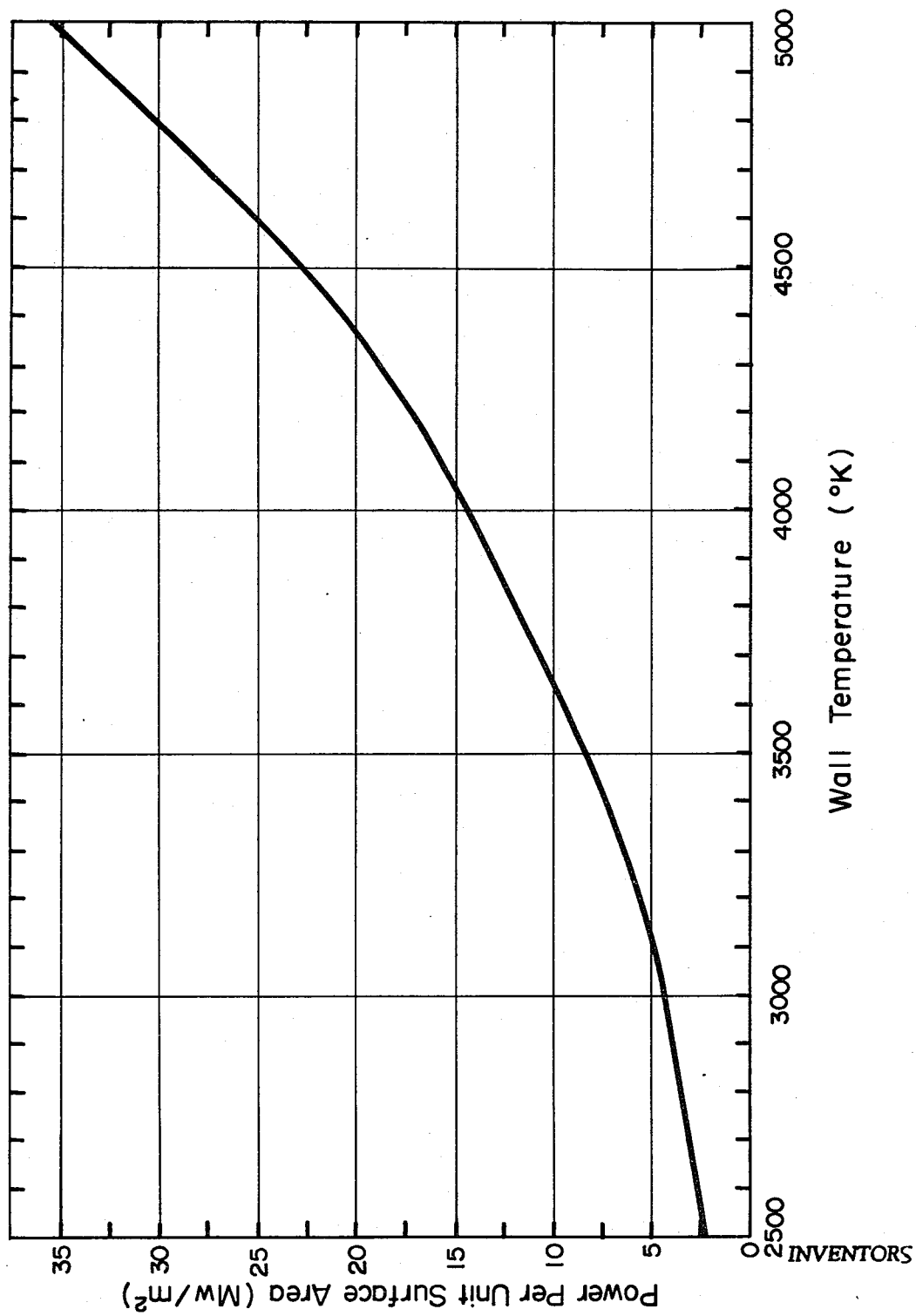
FIG. 6 is a graph of radiation power from walls versus wall temperature.

FIG. 6 shows the power per square meter radiated from the cylinder walls as a function of wall temperature for an ideal emitter. This is an indication of the minimum size of a cylindrical gas heater which is necessary to radiate the specified power into the gas contained therein.

Figure 7:
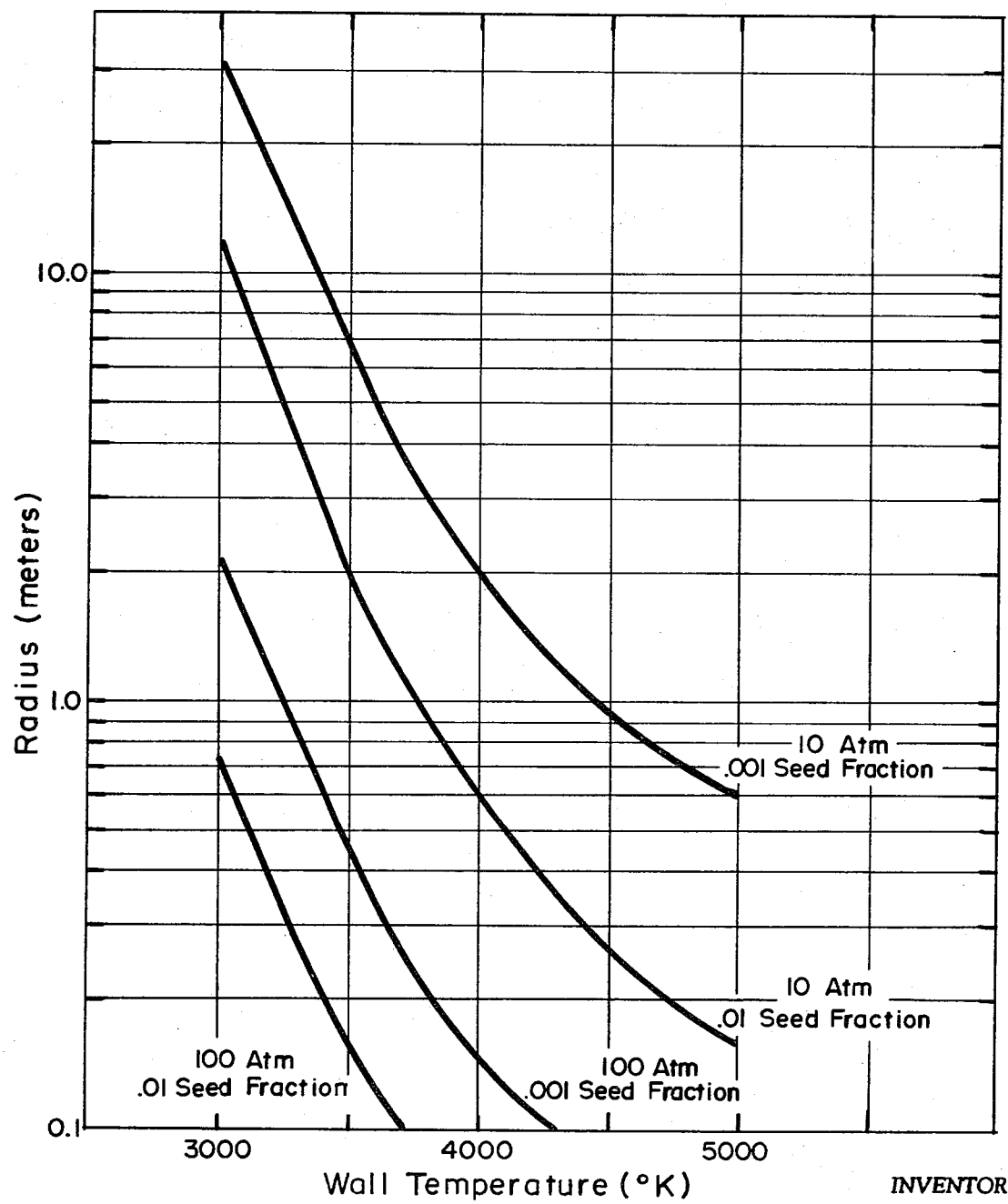
FIG. 7 is a graph of radius of reactor versus wall temperature.

FIG. 7 shows the radius of a cylindrical gas heater versus the wall temperature for the case where 30% of the wall radiation is absorbed under the specified set of conditions. The gas temperature ranges about 300 to 600° K. below that of the wall depending on the particular wall temperature.

Figure 8:
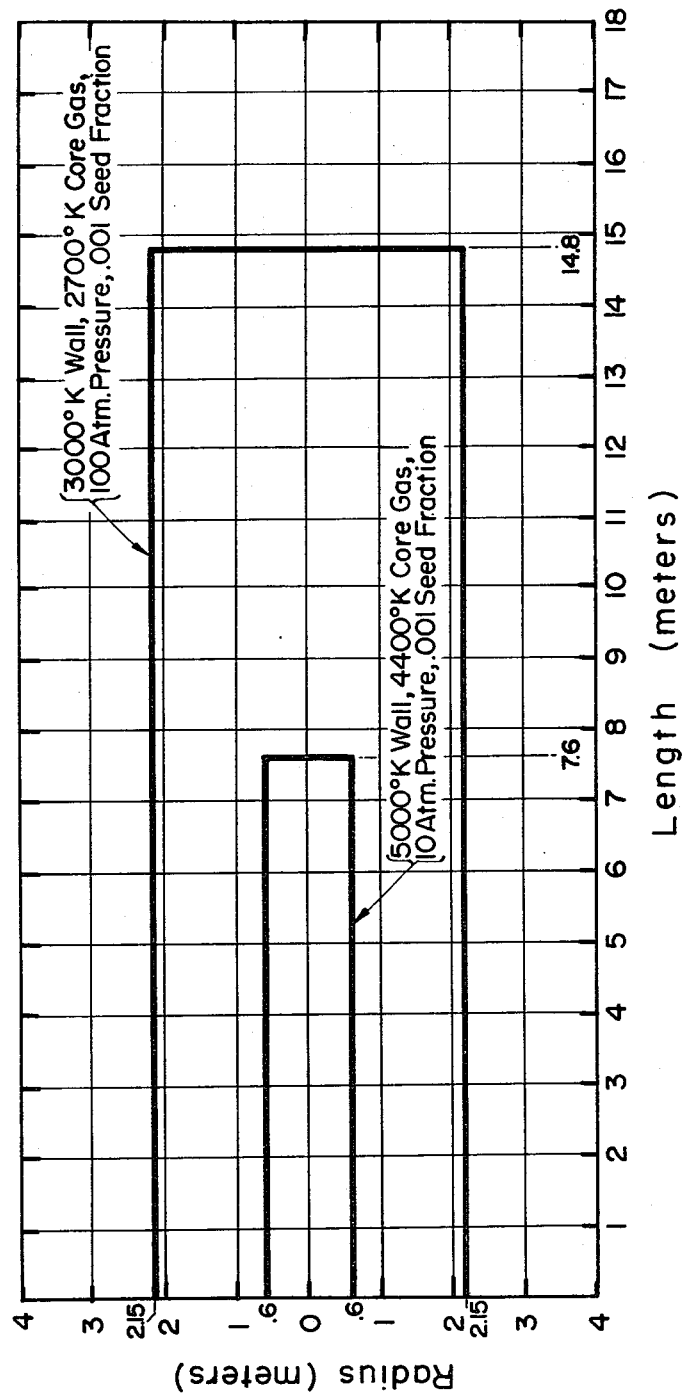
FIG. 8 is a graph of radius of reactor versus length of reactor.

FIG. 8 was constructed using some of the trends shown in FIGS. 4, 5, 6 and 7. Thus, FIGS. 4, 5 and 6 indicate that at increasing wall temperature, pressure and/or seed fraction, a smaller heater radius may be used and still have the gas contained therein absorb the same amount of power from the wall. FIG. 7 indicates that with increasing wall temperature a significantly smaller wall area may be used to input the same radiated power into the contained gas. Therefore, FIG. 8 indicates how these results may be combined to produce a specified power input into the contained gas from a cylindrical heater whose radius (and wall area) decrease sharply with increasinng wall temperature.

FIG. 9 illustrates schematically an installation for carrying out the process of the present invention in which the radiation heat source is a stationary tubular resistance heater. As shown, the tubular heater includes a tube 10 constructed of a refractory material, for example, tantalum carbide which has a melting point of about 4,200° K. The ends of the tube 10 are press-fitted into graphite end caps 12 and 14 which are electrically connected by conductors 16 and 18 to an electric current supply 20. The tube 10 and end caps 12 and 14 are electrically and thermally insulated from the surroundings by suitable means (not shown).

The gas to be heated is passed into the resistance heating tube 10 containing a substantial volume of hot plasma through a delivery tube 22 which is press-fitted into a central opening in the end cap 12. An electrically insulating ring 24 in the opening insulates the tube 10 from the electric heating circuit. The other end cap 14 is provided with a central opening 26 through which the heated gas is discharged. The gas may be obtained from any suitable source, such as a pressure vessel 28, and in the illustrated embodiment the gas from the source 28 passes through pressure control equipment 30 which may include pressure reducers or pumps depending on the magnitude of the pressure desired in the heating tube 10. The preheater 31 may be of any suitable construction for heating the gas initially, e.g., electrically or by heat exchange with a hot fluid, and it may be a separate piece of equipment or merely be a part of the tube 10.

In operating the apparatus shown in FIG. 9, the gas to be heated, for example, hydrogen, is passed into the delivery tube 22 under pressure so as to cause the gas flow through the delivery tube 22, through the heating tube 10 and out the discharge port 26. A cesium electron-ion generator 32 is operated to inject electrons and, of course, the accompanying cesium ions into the hydrogen stream in a ratio of, say, 1 part cesium to 100 parts hydrogen by volume weight. Alternatively, vapor capable of being ionized can be injected into the delivery tube 22 or into the heating tube 10 so as to be ionized by the temperature of gas extent in that portion of the apparatus. The efficiency of the seeding material is dependent on its ionization potential, and on this basis cesium is most efficient. Potassium is almost as effective, however, and may be preferred because of its lower cost. Electric current is caused to flow through the resistance heating tube 10 to heat the same to high temperature, for example, 4000° K., the maximum temperature being limited in practice to the melting point of the tube 10, if the furnace is not rotated as previously mentioned. However, if sufficiently rapid rotation is effected, such as the system of Grosse et al. previously cited, the wall temperature is limited only by vapor pressure considerations which, for example, in the case of a tungsten wall would be in excess of 5,000° K.

The electron seeded hydrogen in the heating tube 10 not only mixes with the hot plasma, but is also exposed to a very high thermal radiation flux so that it becomes rapidly heated.

The heated plasma is then withdrawn through port 26 at a rate such that the mass of plasma in tube 10 remains substantially constant.

FIG. 10 illustrates a "liquid-pipe" or "rotating furnace" form of apparatus suitable for heating a gas stream to temperatures near the melting point of the inner wall of a tubular resistance heater. In this construction, a tube or pipe is rotated about its own axis at a speed such that centrifugal force forms liquid material in the tube into a layer on the inner surface of the tube, and resistance heating is obtained by passing electric current through the liquid layer to maintain it at least at its melting point.

The apparatus of FIG. 10 includes a horizontal refractory tube 10' containing hot plasma which is press-fitted into graphite end caps 12' and 14'. The caps are secured to metal shaft pieces 34 and 36 which are mounted within bearings 38 and 40. The outer end of the shaft 36 carries a pulley 42 which is belt-connected to a motor drive 44. The tube 10' is encased in thermal insulation 46 which is retained by the walls of a metal drum 48.

The end caps 12' and 14' are provided with bores 50 which are of slightly smaller diameter than the inside of the refractory tube 10' so that the latter is capable of centrifugally retaining a liquid metal layer 52 on its inner surface when the tube 10' and end caps 12' and 14' are rotated. The layer 52 is maintained in a liquid condition by passing electric current longitudinally through the layer. The electrical connections are made by means of a copper disc 54 carried by each shaft piece 36, 38. The lower portion of each disc 54 dips into a mercury bath 56 which is electrically connected to a power source 20' by conductors 16' and 18'.

Preheated gas to be heated, is seeded with electrons from an ion generator 32 to render it somewhat opaque and is introduced into the bore of the tube 10' through a delivery tube 22' in the same manner as described with reference to FIG. 10. Heating of the seeded gas stream takes place rapidly by absorption of the radiant energy being given off by the molten metal layer 52 as well as by adsorbing heat from mixing with the hot plasma in tube 10'.

The present invention has potential application in the field of rocket propulsion, although it is not limited to this field. Application to rocket propulsion derives readily from the well-recognized fact that the performance of a rocket engine in space depends in large part on the temperature and molecular weight of the exhaust gas according to the equation $$I_{sp} = k \left(\frac{T}{M}\right)^{1/2}$$

where $I_{sp}$ is the specific impulse in seconds (i.e., pounds of thrust per pound of fuel utilized per second), T is absolute temperature in °K., M is the molecular weight of the exhaust gas and $k$ is essentially a constant. Since extremely high temperature and low molecular weight can produce a high specific impulse, hydrogen heated to very high temperature has been suggested previously as an ideal space propellant.

One way which has been suggested for creating the extremely high temperature, say, 5000° K., in the exhaust gas of a hydrogen rocket is to pass the hydrogen through the core of a specially constructed nuclear reactor. The fuel in such a reactor would be molten, and the special construction would be directed toward containing the molten fuel while providing for effective transfer of heat to the hydrogen stream. Broadly, it was suggested that such a nuclear reactor can comprise a tube or drum rotating about its axis, a layer of molten nuclear fuel held against the inner surface of the tube by centrifugal force and means for bubbling the hydrogen through the liquid layer, the latter feature being necessary to effect good heat transfer to the hydrogen.

The present invention is not concerned with the problems relating to the construction and operation of a nuclear reactor. The invention is concerned, however, with some of the same problems of heat transfer which exist in such a reactor and, accordingly, the invention is related to and solves some of the problems associated with generating thrust by this means. These same heat transfer problems exist, of course, regardless of the nature of the heat source and the end use of the hot gas stream, and the advantages of the invention are therefore applicable, generally, to the heating of a gas stream by any process employing a radiation field as the heat source or to the removal of heat from a radiation field where the object is to cool rather than to heat. Specifically, the invention shows that it is possible to obtain very high gas temperatures in a very short time.

Another application for the novel process of this invention resides in the generation of electric current by magneto-hydrodynamics (MHD). Thus, the hot plasma stream can be fed into a MHD generator to produce electric current and the resulting cool gas recycled back to the heating zone and heated to elevated temperatures in the manner previously set forth.

It is to be understood that this invention is not limited to any particular source of thermal radiation and is, in fact, inclusive of all sources capable of generating the desired temperatures. It is preferred, however, to use nuclear reactors.

It is understood that many variations or modifications of this invention are possible and it is not intended that it be limited except by the appended claims.

What is claimed is:

1. A process for heating a gas to a temperature of from 2000° K. to about 7000° K. which comprises introducing a cool gas together with electrons or source thereof into a heating zone which is subjected to thermal radiation from a heat source and which contains a substantial quantity of hot plasma maintained at a temperature of about 2000° to about 7000° K., said heating zone having walls which transmit heat to said plasma by thermal radiation from said walls; permitting said cool gas to intimately mix with said hot plasma without flowing through said heat source so as to absorb heat therefrom and from said walls and withdrawing heated plasma at a temperature of 2000° to about 7000° at a rate such that the amount of plasma in the heating zone remains substantially constant.

2. A process for heating a gas to a temperature of about 2000° K. to about 7000° K. which comprises introducing a cool gas together with electrons or source thereof into a heating zone which is subjected to thermal radiation from a heat source and which contains a substantial quantity of hot plasma maintained at a temperature of about 2000° to about 7000° K. at a pressure of at least about 0.1 atmosphere, said heating zone having walls which transmit heat to said plasma by thermal radiation from said walls, permitting said cool gas to intimately mix with said hot plasma without flowing through said heat source so as to absorb heat therefrom and from said walls and withdrawing heated plasma at a temperature of 2000° to about 7000° at a rate such that the amount of plasma in the heating zone remains substantially constant.

3. A process for heating a gas to a temperature of from about 2000° K. to about 7000° K. which comprises introducing a cool gas together with electrons or source thereof into a heating zone which is subjected to thermal radiation from a heat source and which contains a substantial quantity of hot plasma maintained at a temperature of about 2000° to about 7000° K. at a pressure of at least about 10 atmospheres, said heating zone having walls which transmit heat to said plasma by thermal radiation from said walls, permitting said cool gas to intimately mix with said hot plasma without flowing through said heat source so as to absorb heat therefrom and from said walls and withdrawing heated plasma at a temperature of 2000° to about 7000° at a rate such that the amount of plasma in the heating zone remains substantially constant.

4. Process of claim 3 wherein the gas is hydrogen, nitrogen, helium or mixtures thereof.

5. Process of claim 3 wherein gas is heated to a temperature of 3000° K. to 7000° K.

6. Process of claim 3 wherein the source of electrons is an alkali metal vapor.

7. Process of claim 6 wherein alkali metal is cesium.

8. Process of claim 6 wherein gas is hydrogen.

References Cited

UNITED STATES PATENTS

| 2,819,423 | 1/1958 | Clark | 60—203 |
| 3,309,873 | 3/1967 | Cann | 60—203 |
| 3,447,321 | 6/1969 | Romero | 176—39 |
| 3,467,885 | 9/1969 | Cann | 60—203 |

REUBEN EPSTEIN, Primary Examiner

U.S. Cl. X.R.

176—39; 60—203; 219—121 P